(12) United States Patent
Dietzel et al.

(10) Patent No.: US 7,612,555 B2
(45) Date of Patent: Nov. 3, 2009

(54) HIGH-RESOLUTION MAGNETIC ENCODER

(75) Inventors: Andreas Dietzel, Kempen (DE);
Marcus Breuer, Dalheim (DE); Hubert Grimm, Mommenheim (DE);
Karl-Heinz Lehnhert, Mainz (DE);
Nikolaus Luckner, Ober-Olm (DE);
Rolf Schaefer, Walluf (DE); Guenther Michaelis, Oppenheim (DE)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 10/580,766

(22) PCT Filed: Oct. 29, 2004

(86) PCT No.: PCT/EP2004/052719

§ 371 (c)(1),
(2), (4) Date: Mar. 22, 2007

(87) PCT Pub. No.: WO2005/052518

PCT Pub. Date: Jun. 9, 2005

(65) Prior Publication Data

US 2007/0268017 A1  Nov. 22, 2007

(30) Foreign Application Priority Data

Nov. 26, 2003  (EP)  ................... 03104380

(51) Int. Cl.
*G01R 33/09* (2006.01)
*G01R 33/12* (2006.01)
*G01B 7/30* (2006.01)

(52) U.S. Cl. .............. 324/207.21; 324/210; 324/207.25
(58) Field of Classification Search ............ 324/207.21, 324/207.25, 249, 252, 210–213; 360/128–129, 360/313–318, 324–326; 428/810–811.5, 428/812–816
See application file for complete search history.

(56) References Cited

U.S. PATENT DOCUMENTS 4,646,088 A   2/1987   Inoue
(Continued)

FOREIGN PATENT DOCUMENTS

EP   0 932 019 A2   7/1999
JP   2001202606 A2  7/2001

OTHER PUBLICATIONS

PCT International Preliminary Report on Patentability (IPER) in corresponding international patent application PCT/EP2004/052719, dated Jun. 8, 2006.

*Primary Examiner*—Bot L LeDynh

(57) ABSTRACT

A high-resolution magnetic encoder system includes a magnetic resistive sensor, a fixed suspension, and a mechanism. The magnetic resistive sensor is mounted to the fixed suspension above a magnetic medium having at least one magnetic track. The fixed suspension is attached to the mechanism, such as a housing, a substrate, and/or an electronic board. The sensor is adapted to perform a relative movement with respect to and in close contact to the surface of the magnetic medium. The magnetic medium may be protected by an overcoat layer. The magnetic resistive sensor may be Giant Magnetic-Resistive (GMR) sensor and/or a Tunneling Magnetic-Resistive Sensor (TMR).

15 Claims, 2 Drawing Sheets

U.S. PATENT DOCUMENTS

| | | |
|---|---|---|
| 6,473,278 B1 | 10/2002 | Gill |
| 6,762,909 B2 * | 7/2004 | Albrecht et al. .......... 360/97.02 |
| 7,141,965 B2 * | 11/2006 | Breuer et al. .......... 324/207.21 |
| 7,208,948 B2 * | 4/2007 | Schaefer ..................... 324/260 |
| 7,355,399 B2 * | 4/2008 | Schaefer ..................... 324/260 |
| 7,405,556 B2 * | 7/2008 | Breuer et al. .......... 324/207.21 |
| 2003/0123197 A1 | 7/2003 | Mizuguchi et al. |
| 2005/0013040 A1 * | 1/2005 | Baumgart et al. ........ 360/97.02 |

* cited by examiner

HIGH-RESOLUTION MAGNETIC ENCODER

FIELD OF THE INVENTION

The present invention relates in general to a high-resolution magnetic encoder system. More specifically, the present invention is concerned with such a system that uses Giant Magnetic-Resistive (GMR) or Tunneling Magnetic-Resistive (TMR) technology.

BACKGROUND OF THE INVENTION

Devices for quantitative detection of linear and rotary movements are known. Optical encoders are used to detect the rotation angle, a length and a direction of a rotary movement, or, respectively, linear movement of moving bodies. The primary components of such a device are the emitter system, a grid plate, normally a grid disk or a grid straight edge, and the detector system. The emitter system normally contains a light emitting diode (LED). The light beam emitted from the light emitting diode or laser diode is modulated by the grid plate. The grid plate is connected to a moving body and has a periodic opening pattern. The detector system detects the transmitter signal (modulated by the grid plate) from the laser diode and, at the output, supplies information relating to the light beam and the direction of movement.

High-resolution magnetic encoders using Hall sensors are also known. Furthermore, magnetic encoders (magneto-electric converters) that employ a magnetoresistance effect element made of a thin ferromagnetic film, have been commonly used in various fields due to their good durability in a surrounding atmosphere, wide operational temperature range, and high response frequency. For example, magnetic encoders are used for controlling the rotational speed of a capstan motor in a video tape recorder or the like. Generally speaking, magnetic encoders are used for positional or speed control in factory automation (FA) equipments, such as servomotors, robots and the like, or in office automation (OA) equipments, such as printers and copying machines. In recent years, there has been an increasing demand for improving the accuracy of such equipments. In general, the magnetic encoder includes a magnetic recorder and a magnetic sensor disposed in opposition to the magnetic recorder. The magnetic recorder comprises a non-magnetic substrate and a recording medium, which is a permanent magnetic material, coated on the peripheral or flat surface of the non-magnetic substrate. The recording medium is magnetized in a multipolar fashion at a magnetizing pitch λ to form at least one magnetic signal track.

A hard disk drive (HDD) is a digital data storage device that writes and reads data via magnetization changes of a magnetic storage disk along concentric information tracks. During operation of the HDD, the disk is rotated at speeds in the order of several thousand revolutions-per-minute (RPM) while digital information is written to or read from its surface by one or more magnetic transducers. To perform an access request, the HDD first positions the sensor and/or write head, also referred to as a "read/write head", at the center of the specified data track of the rotating disk.

During operation of the HDD, the read/write head generally rides above the disk surface on a cushion of air, caused by an "air bearing surface," that is created by the movement of the disk under the head. The distance between the read/write head and the disk surface while riding, or partially riding, on the air cushion is referred to as the "flying height" of the head. Further, the head is carried by a "slider" which is supported by hydrodynamic lift and sink forces. These lift forces are given by the interaction of air streaming underneath the surface structure of the slider.

To build encoder applications with high resolution, it is important to minimize the gap between the sensor and the information track. As the air bearing surface varies with the rotation speed, using air pressure as with the HDD applications is not possible if the variation of the relative movement is too high. Known optical encoders are limited to a small temperature range due to high sensitivity of the used sensors to temperature changes. The resolution of these encoders is also very sensitive to dust and humidity of the environment. Hall sensors are very sensitive to temperature changes and thus can also not be used in a wide temperature range as required in the field of automotive applications, industrial applications or the like.

SUMMARY OF THE INVENTION

The present invention relates to a high-resolution magnetic encoder. A high-resolution magnetic encoder system of one embodiment of the invention includes a magnetic resistive sensor and a fixed suspension. The magnetic resistive sensor is mounted to the fixed suspension above a magnetic medium. The sensor is adapted to perform a relative movement with respect to and in close contact to a surface of the magnetic medium.

A method of one embodiment of the invention is for fabricating a magnetic encoder disk. A servo pattern is provided within a contact stencil mask. The servo pattern is transferred into a latent pattern within a magnetic coating of the magnetic encoder disk, such as via ion irradiation. The latent magnetic pattern is activated, such as by applying a magnetic field saturating the magnetic encoder disk in one direct, and reversing features irradiated through the contact stencil mask.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The rotary magnetic encoder system of the present invention uses a magnetic media on a substrate and a magnetic sensor. In a preferred embodiment, the magnetic medium is a magnetic layer deposited on a substrate. This substrate must be rigid and can be selected from the group consisting of plastics, ceramic, silicon and glass. An overcoat layer, selected from the group consisting of layers of DLC, $C_xN_y$, $BN_x$, cBN, $B_xC_y$, $B_x$-$C_y$-$N_z$ gradient layer, $SiN_x$, SiC, TiN, WC, $AlO_x$ and the like, and preferably being a DLC-layer (Diamond Like Carbon layer), covers the magnetic medium and will help to adjust the distance (gap) between the at least one magnetic track provided on the magnetic medium and the magnetic sensor. In a preferred embodiment, the magnetic sensor is a GMR (Giant Magnetic-Resistive) or a TMR (Tunneling Magnetic-Resistive) sensor, and can as well be covered by, e.g., a DLC-layer.

Figure 1:
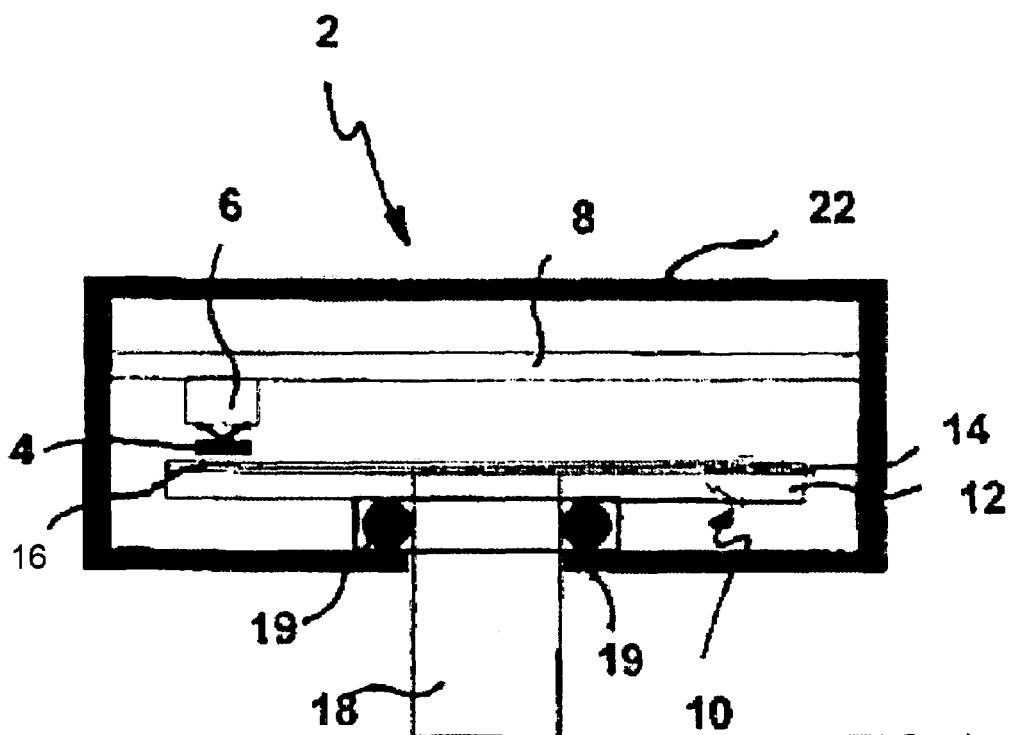
FIG. 1 schematically depicts an embodiment of the inventive magnetic encoder.

FIG. 1 shows a preferred embodiment of the inventive magnetic encoder system 2. A magnetic sensor 4 is mounted on a suspension 6 fixedly arranged on a substrate 8 above a magnetic medium 10. In the present example, the magnetic medium is a rotating disk 12 on which a magnetic layer 14 is deposited. The magnetic layer 14 carries at least one magnetic track 16. The substrate 8 may be, e.g., an electronic board or the like. The rotating disk 12 is mounted on a shaft 18 with at least one ball bearing 19. To stabilize the mechanical tolerances, the shaft can be reach up to the top of the housing, where a second ball bearing (not shown) is mounted. The shaft 18 is connected to the external device (not shown) the rotation movement of which is to be evaluated, e.g., a motor or the like.

It is noted that the sensor 4 is adapted to perform a relative movement with respect to the magnetic medium 10, i.e., either the substrate 8 or the magnetic medium can be rotated or moved. A rotation of the substrate 8 to which the suspension 6 is attached may be difficult due to the evaluation unit and the respective leads attached to the substrate, however, in case the respective connections are realized without actual physical leads, e.g., wireless, which can be done very easily. The sensor 4 moves in close contact to the surface of the magnetic medium 10 that is protected by a hard cover (overcoat) layer 20, that is selected from the group consisting of layers of DLC, $C_xN_y$, $BN_x$, cBN, $B_xC_y$, $B_x$-$C_y$-$N_z$ gradient layer, $SiN_x$, SiC, TiN, WC, $AlO_x$ and the like, and preferably is a DLC layer. The whole system may be encapsulated by a housing 22.

It is noted that the suspension can as well be attached to the housing 22 instead of the substrate 8. The overcoat may be covered by a lubricant layer (not shown), selected from the group consisting of long chain hydrocarbons, MoS, MoSe, Teflon, perfluoropolyether (PFPE), and the like. The modulation of the magnetic field leads to a modulation of the resistance of the GMR element. If a constant current is applied, the output voltage has a sinusoidal characteristic. When using incremental encoders it will be possible to count maxima or zero points. Extrapolation for higher resolutions is however possible. When using absolute encoders, it will have multiple tracks that represent a code.

Figure 2:
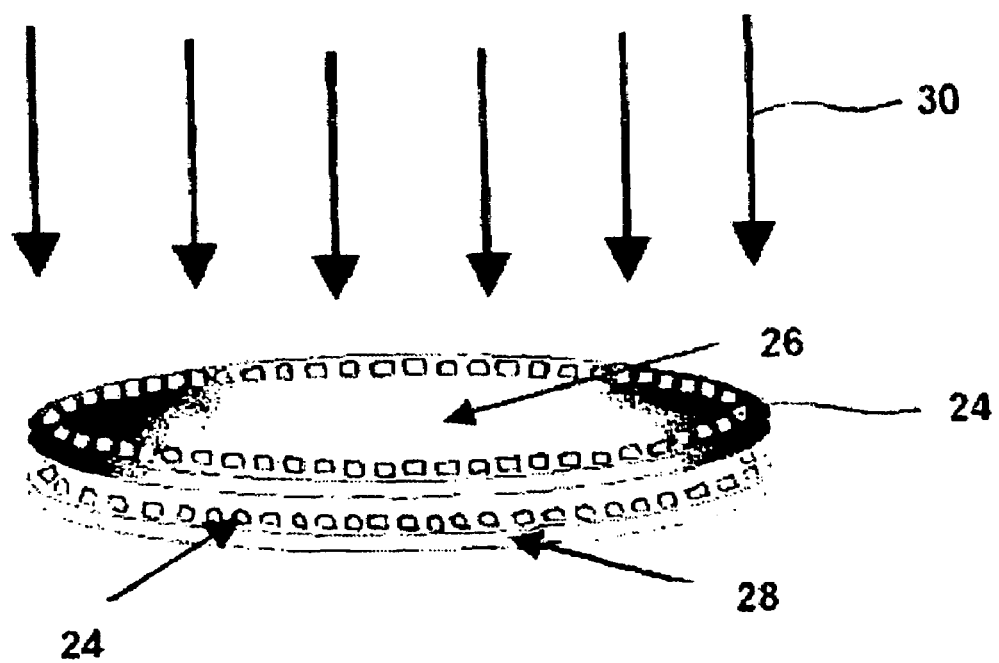
FIG. 2 schematically shows how a latent magnetic image is transferred from a contact stencil mask by ion irradiation, according to an embodiment of the invention.

Since optical encoder disks for relative and absolute angle determination are limited in resolution and are facing problems when they are exposed to elevated temperatures as occurs for instance in automotive applications, it is desirable to create a planar disk with magnetic encoder features that can be read out by contact to a read sensor. It is known that by ion irradiation magnetic properties of magnetic films such as CoPt multilayers can be modified. In such a way the irradiated areas can be magnetically softened. This process can be precisely controlled by the ion dose applied. As shown in FIG. 2, a servo pattern 24 which is defined in a contact stencil mask or a resist mask 26 can be transferred into a latent magnetic pattern in the magnetic coating of an encoder disk 28 by applying ion irradiation 30.

Figure 3:
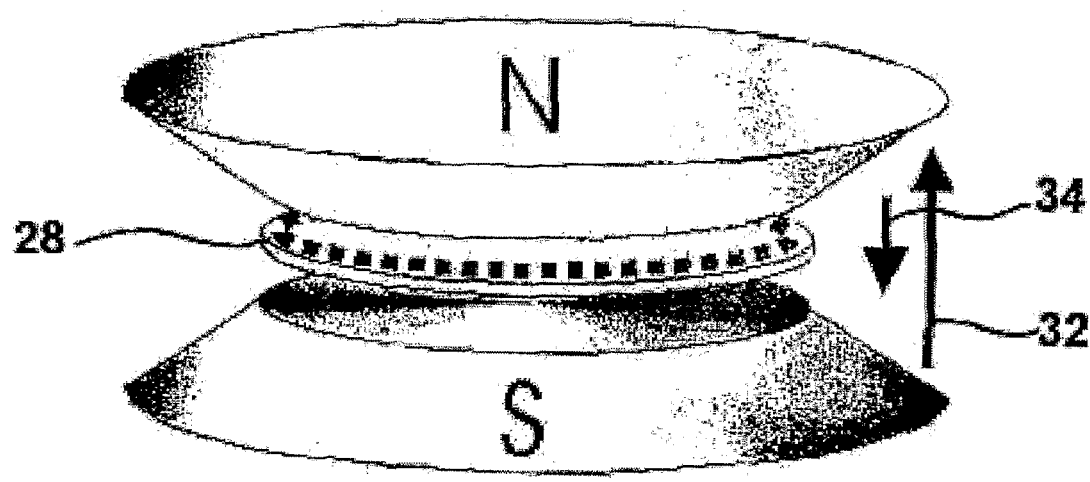
FIG. 3 shows the activation of the latent magnetic servo patterns by external magnetic fields, according to an embodiment of the invention.

As known from patterned media fabrication using ion beams, the disk surface remains unmodified under adequate irradiation conditions. In contrast to the patterned storage media the latent magnetic patterns of the encoder disk are not transferred into a magnetization pattern by a single island write process but are activated by large area homogeneous magnetic fields that develop all the magnetic patterns in parallel. As shown in FIG. 3, a magnetic field 32 saturates the full disk 28 in one direction. Subsequently, a smaller counter magnetizing magnetic field 34 is applied which reverses only the irradiated islands, thereby activating the full servo pattern on the entire disk 28.

Figure 4:
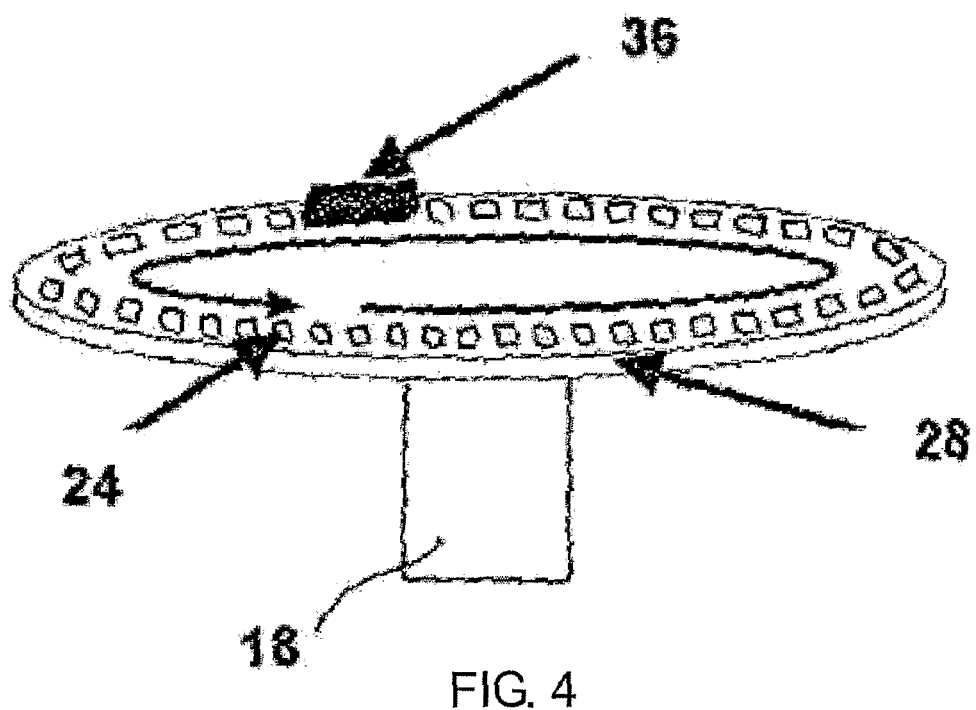
FIG. 4 schematically shows how the activated servo patterns of FIG. 3 can be read out by a magnetic sensor, according to an embodiment of the invention.

The ion beam technology switches from longitudinal to vertical recording. Therefore, the size of a magnetic bit can be lowered while still having a big magnetic field. Because the disk surface remains unmodified throughout the irradiation and magnetization procedure, a magnetic read sensor 36 in contact with the rotating disk 28 can read very small magnetic servo structures 24 as shown in FIG. 4. The near field sensing allows a reduction in the servo features to provide for finest resolution. The magnetic coercivity of the servo features that is adjusted during the ion irradiation is still high enough to allow for thermal stability of the pattern even at elevated temperatures. An additional advantage is that all encoder servo features are generated as latent patterns and then activated simultaneously in a simple magnet, thereby superseding any costly servo writing procedures.

Since the servo patterns are activated by an external magnet, the track width of the pattern can be large compared to the read sensor dimensions, giving a large tolerance for radial runouts. The servo pattern is defined with the mask layout, therefore there are no dead or undefined sectors like in sequential writing at the start and stop sectors. The inventive system has the advantage that, due to the GMR technology used, high temperature resistivity/stability can be achieved.

Further advantages of the proposed solution are that because of the low weight of the sensor and the flexible suspension, which as well can be protected by a DLC-layer, the system is highly shock- and vibration-resistant. This is because there is no need of precisely aligned optical elements inside the encoder package, and because high signal amplitudes can be achieved due to wide magnetic tracks, since the resolution of the encoder is not limited by the radial dimension of the magnetic pattern and the low spacing between sensor and magnetic medium.

Furthermore, the system works in start-stop-mode and with varying angle velocities (rpm). In a HDD a constant rotation speed is necessary. In an encoder the speed varies between zero and a maximum and the direction of motion can also change. Therefore an ABS (air bearing surface) adjusting the flight height cannot be designed for encoders. For contact reading like in the encoder according to the present invention, the ABS is only a question of minimizing the wear. The ABS is not necessary to adjust the flight height.

In addition, absolute and differential signals are provided and the magnetic patterns can be produced with high areal density, which leads to a very high resolution. Further advantages are that the GMR sensitivity is not affected by humidity or dusty environment and that the encoder system is scalable to higher resolution. Due to the ion beam technology and the low magnetic spacing the magnetic bit can be very small. Enlarging the bit size, which lowers the resolution, is not an issue. Therefore the encoder resolution is scalable over several orders of magnitude.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

The invention claimed is:

1. A high-resolution magnetic encoder system comprising:
   a magnetic surface having a latent magnetic pattern corresponding to an encoder servo pattern;
   a magnetic resistive sensor to detect the latent magnetic pattern to read out the latent magnetic pattern to quantitatively detect movement of the magnetic resistive sensor and the magnetic surface relative to one another; and,
   a fixed suspension to which the magnetic resistive sensor is mounted above a magnetic medium having the magnetic surface,
   wherein the sensor is adapted to perform a relative movement with respect to and in close contact to the magnetic surface of the magnetic medium.

2. The high-resolution magnetic encoder system of claim 1, further comprising a mechanism to which the fixed suspension is attached.

3. The high-resolution magnetic encoder system of claim 2, wherein the mechanism is a substrate.

4. The high-resolution magnetic encoder system of claim 3, wherein the substrate is an electronic board.

5. The high-resolution magnetic encoder system of claim 2, wherein the mechanism is a housing.

6. The high-resolution magnetic encoder system of claim 1, wherein the magnetic medium is protected by an overcoat layer.

7. The high-resolution magnetic encoder system of claim 6, wherein the overcoat layer is one of DLC, $C_xN_y$, $BN_x$, cBN, $B_xC_y$, $B_x$-$C_y$-$N_z$ gradient layer, $SiN_x$, SiC, TiN, WC, $AlO_x$.

8. The high-resolution magnetic encoder system of claim 1, wherein the magnetic medium is a magnetic layer deposited on a rotating disk.

9. The high-resolution magnetic encoder system of claim 1, wherein the magnetic medium is a planar disk having magnetic encoder features that are readable by the magnetic resistive sensor.

10. The high-resolution magnetic encoder system of claim 1, wherein the magnetic resistive sensor is a read/write magnetic head.

11. The high-resolution magnetic encoder system of claim 1, wherein the magnetic resistive sensor is a Giant Magnetic-Resistive (GMR) sensor.

12. The high-resolution magnetic encoder system of claim 1, wherein the magnetic resistive sensor is a Tunneling Magnetic-Resistive (TMR) sensor.

13. The high-resolution magnetic encoder system of claim 1, wherein the system is encapsulated.

14. A high-resolution magnetic encoder system comprising:
   a magnetic surface having a latent magnetic pattern corresponding to an encoder servo pattern;
   magnetic means for sensing the magnetic surface of a magnetic medium with respect to which the magnetic means performs a relative movement and with which the magnetic means is in close contact, the magnetic means further for detecting the latent magnetic pattern to read out the latent magnetic pattern to quantitatively detect movement of the magnetic means and the magnetic surface relative to one another; and,
   suspension means for suspending the magnetic means in a fixed manner above the magnetic medium.

15. The high-resolution magnetic encoder system of claim 14, wherein the magnetic means comprises one of a Giant Magnetic-Resistive (GMR) sensor and a Tunneling Magnetic-Resistive (TMR) sensor.

* * * * *